(12) United States Patent
Haberl

(10) Patent No.: US 11,505,049 B2
(45) Date of Patent: Nov. 22, 2022

(54) LOCKING DEVICE COMPRISING A LINK MECHANISM AND A SLIDE

(71) Applicant: Webasto SE, Stockdorf (DE)

(72) Inventor: Franz Haberl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 848 days.

(21) Appl. No.: 16/401,167

(22) Filed: May 2, 2019

(65) Prior Publication Data

US 2019/0337367 A1     Nov. 7, 2019

(30) Foreign Application Priority Data

May 3, 2018    (DE) ..................... 10 2018 110 634.3

(51) Int. Cl.
   *B60J 7/185*    (2006.01)
(52) U.S. Cl.
   CPC ........... *B60J 7/1858* (2013.01); *B60J 7/1851* (2013.01)
(58) Field of Classification Search
   CPC ........ B60J 7/1851; B60J 7/194; B60J 7/1853; B60J 7/1858
   USPC ........................................... 292/64; 296/121
   See application file for complete search history.

(56) References Cited

U.S. PATENT DOCUMENTS

| 7,407,201 | B2 * | 8/2008 | Pfertner | ................ | B60J 7/1851 |
| | | | | | 292/216 |
| 8,444,207 | B2 * | 5/2013 | Wilke | .................... | E05B 83/00 |
| | | | | | 292/216 |
| 2009/0179453 | A1 * | 7/2009 | Schumacher | .......... | B60J 7/1851 |
| | | | | | 296/121 |
| 2018/0015813 | A1 * | 1/2018 | Rudolfi | ................. | B60J 7/1858 |

FOREIGN PATENT DOCUMENTS

| DE | 103 00 881 A1 | 7/2004 |
| DE | 10 2008 008 747 A1 | 8/2009 |
| DE | 10 2016 112 963 A1 | 1/2018 |
| DE | 10 2016 124 451 A1 | 6/2018 |

* cited by examiner

*Primary Examiner* — Joseph D. Pape
*Assistant Examiner* — Veronica M Shull
(74) *Attorney, Agent, or Firm* — Quarles & Brady LLP

(57) ABSTRACT

A locking device for a convertible top includes a locking support, a locking hook which can be translationally and rotationally shifted so as to be displaced between a disengaged position and an engaged position and which is engaged with a locking counterpart when in the engaged position, and a drive for the locking hook. The drive includes a driving element which is driven rotationally about an axis of rotation by a driving unit and which drives, via a link mechanism, a slide which can be moved on the locking support and which is connected to the locking hook, the locking hook being displaced when the slide is moved. The link mechanism includes a coupling link which is hinged to the slide and a support link which is hinged to the coupling link and which is guided in a guide track of the locking support when the driving element is actuated.

19 Claims, 10 Drawing Sheets

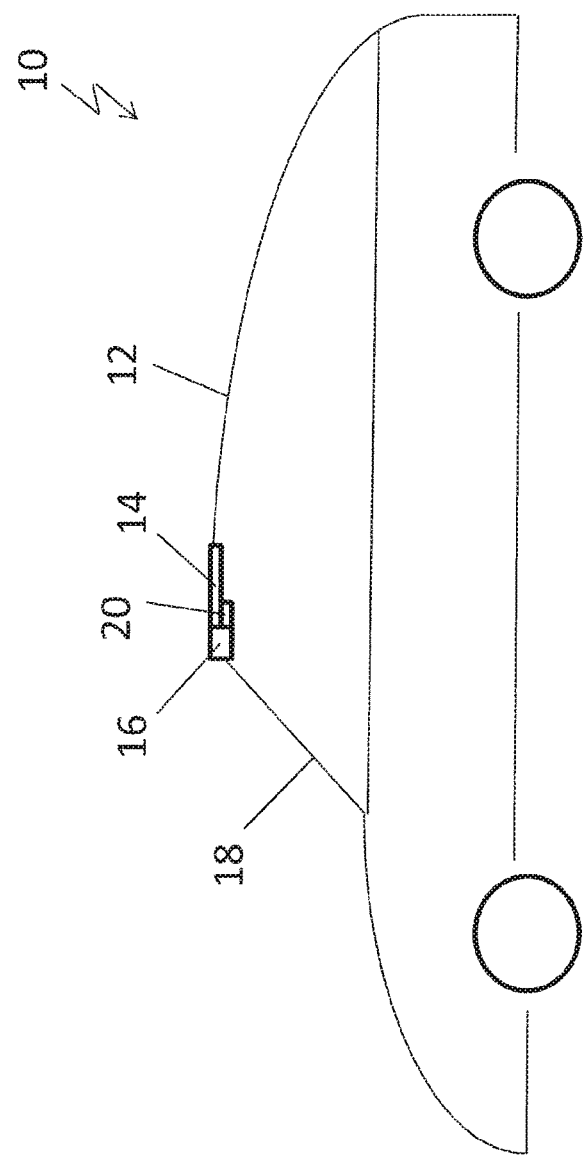

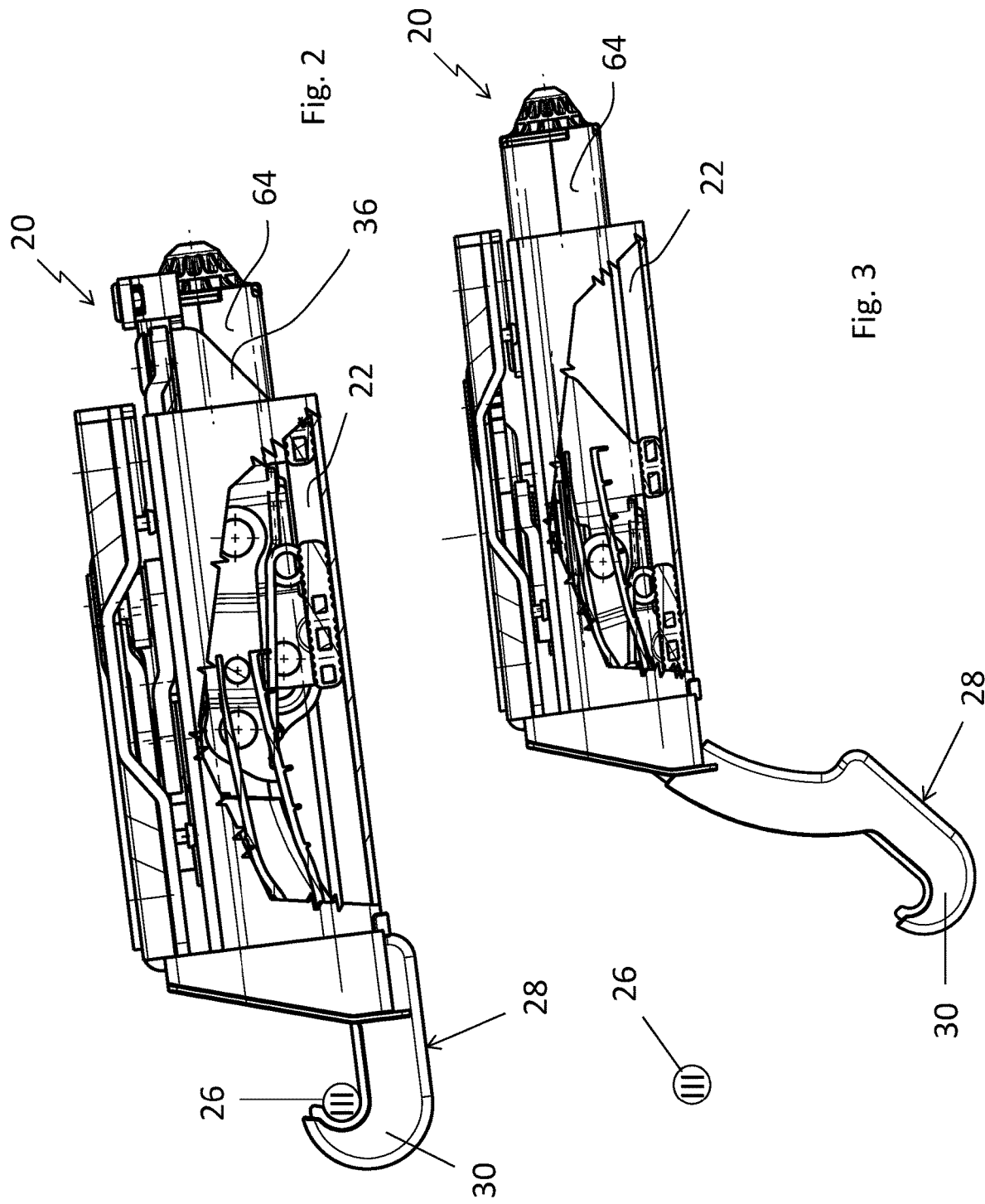

LOCKING DEVICE COMPRISING A LINK MECHANISM AND A SLIDE

CROSS-REFERENCE TO RELATED APPLICATIONS

This application claims priority to German Patent Application No. 10 2018 110 634.3 filed on May 3, 2018. The contents of these applications are hereby incorporated by reference as if set forth in their entirety herein.

BACKGROUND

The disclosure relates to a locking device for a convertible top, said locking device having the features of the preamble of claim 1, and to a top of a convertible vehicle having such a locking device.

A generic locking device is known from document DE 10 2010 044 702 A1 and serves to fix a rigid roof element, which may be a front bow of a folding top or a rigid roof shell of a retractable hard top, to a front header of the vehicle in question. This locking device comprises a locking support, which forms a lock housing and can be fixed to the rigid roof element. On the locking support, a locking hook can be translationally and rotationally shifted between a disengaged position and an engaged position. In the engaged position, the locking hook is engaged with a locking counterpart formed on the front header of the vehicle. For driving the locking hook, the locking device has a drive which drives a slide which can be moved on the locking support and which is connected to the locking hook. The drive comprises a drive unit which is realized as an electric motor and which drives a driving wheel which is connected to the slide via a link mechanism.

SUMMARY

The object of the disclosure is to provide a locking device of the kind mentioned above that offers additional options for securing the locking hook in its closed position.

According to the disclosure, this object is attained by the locking device having the features of claim 1.

So the locking device according to the disclosure comprises a slide which is driven by a drive and which is connected to a locking hook. In addition to the drive unit, which is in particular driven electrically, the drive comprises a driving element which can be rotated about an axis of rotation and which is connected to the slide via a link mechanism. The link mechanism comprises a coupling link which is hinged to the slide and a support link which is hinged to the coupling link via one or more hinges and which is guided in a guide track of the locking support when the driving element is actuated. By appropriately designing the support link and the coupling link and the hinge points thereof, it is possible for the coupling link and the support link to be in a position relative to each other that secures the slide against displacement when the locking hook is in the engaged position so that a force acting on the locking hook and thus on the slide cannot displace the locking hook into its disengaged position because the forces are absorbed by the support link which bears on the locking support in the guide track.

In a specific embodiment of the locking device according to the disclosure, the support link is connected to the driving element. This means, in turn, that the driving forces exerted by the driving element are introduced into the support link and from there into the coupling link and the slide.

In order to be able to even better secure the engaged position of the locking hook, it is advantageous for the support link to have a coupling journal which engages into a slotted track of the driving element. So the hinge point hinging the support link to the driving element is not stationary, but shifts when the locking hook is moved from its engaged position into the disengaged position or vice-versa.

In order to ensure that no forces that correspond to the driving direction for displacement into the disengaged position act on the drive element when the locking hook is in the engaged position, it is advantageous if the slotted track of the driving element has a driving portion and a latching portion which extends at an angle relative to the driving portion, i.e. whose main axis forms an angle of less than 180° relative to the main axis of the driving portion. When the locking hook is in the engaged position and an undesired opening force is applied to the locking hook and the coupling journal of the support link is located in the latching portion, a torque is exerted on the driving element if the latching portion is aligned accordingly, said torque acting the direction of rotation which corresponds to a shift of the locking hook into the engaged position.

The slotted track of the driving element enables sensors potentially present on the locking device and detecting the engaged position of the locking hook to cover a larger angle of rotation of the driving element because the coupling journal travels through the slotted track to achieve latching only after the locking hook has arrived in the engaged position. Hence, the component tolerances have to meet lower requirements in terms of the sensors in question as compared to previous solutions.

In an advantageous embodiment of the locking device according to the disclosure, in which the link mechanism preferably assumes an over center position or latched position when the locking hook is in the engaged position, the link mechanism comprises, in addition to the support link and the coupling link, a guiding link which is hinged to the support link and/or to the coupling link and which preferably has a pivot axis that coincides with the axis of rotation of the driving element. The link mechanism can thus have an over-center linkage which latches the slide relative to the locking support when the locking hook is in the engaged position. The driving element, which is preferably provided with the slotted track, prevents the support link from pivoting. The link mechanism also ensures that no torque whatsoever is exerted from the slide onto the driving element when the link mechanism is in the latched or secured state, i.e. in its over-center position.

In a specific embodiment of the locking device according to the disclosure, in order to clearly define and secure the latched position of the link mechanism associated with the engaged position of the locking hook, the guide track of the locking support has a hook displacement portion and a hook latching portion, the hook displacement portion extending concentrically relative to the axis of rotation of the driving element and the hook latching portion being an end portion of the guide track, said end portion preferably being aligned at least approximately parallel to the direction of travel of the slide.

To additionally secure the locking hook in the engaged position, a securing pin can be disposed on the slide, said securing pin engaging into a corresponding recess of the coupling link when the locking hook is in the engaged position so that the securing pin secures the locking hook against displacement in the direction of the disengaged position. When the locking device is being displaced from the engaged position into the disengaged position, the coupling link is thus first pivoted in such a manner that the securing pin formed on the slide is released. Correspondingly, when the locking device is displaced into the engaged position, the coupling link is pivoted in such a manner that the securing pin and the recess formed on the coupling link are brought into engagement with each other. A pulling torque introduced into the slide by the locking hook is thus absorbed by the coupling link, which is supported on the locking support via the support link.

The driving element of the locking device according to the disclosure is preferably realized as a driving wheel, which can have external teeth. The external teeth can be engaged with a driving pinion which is driven by a driving unit, which is in particular realized as an electric motor.

The slide of the locking device according to the disclosure is preferably connected to a driving and mounting end of the locking hook via a pulling link mechanism. The pulling link mechanism is consequently disposed between the locking hook and the slide, allowing a torque to be introduced into the locking hook, said torque pushing the hook end upward when the locking hook is displaced from a disengaged position into a closed position. The pulling link mechanism can also hold the locking hook in the transverse direction, the locking hook thus having no freedom of movement perpendicular to the direction of travel of the slide.

The disclosure also relates to a top of a convertible vehicle, said top comprising a locking device of the kind described above, by means of which the top or a given top element can be fixed to a front header of the vehicle. A locking counterpart corresponding to the locking device is disposed on the front header, said locking counterpart interacting with a hook end or engaging end of the locking hook in order to fix the top or the top element. The locking counterpart is a bolt or journal, for example, behind which the locking hook can engage.

Other advantages and advantageous embodiments of the subject-matter of the disclosure are apparent from the description, the drawing and the claims.

In the drawing, an embodiment example of a top comprising a locking device according to the disclosure is illustrated in the drawing in a schematically simplified manner and will be explained in more detail in the following description.

BRIEF DESCRIPTION OF THE DRAWINGS

FIG. 1 shows a schematic side view of a convertible vehicle having a top which is fixed to a front header by means of a locking device;

FIG. 2 shows a side view of the locking device in its engaged position;

FIG. 3 shows a side view of the locking device as illustrated in FIG. 2, but with the locking device in its disengaged position;

DETAILED DESCRIPTION

Figure 4:
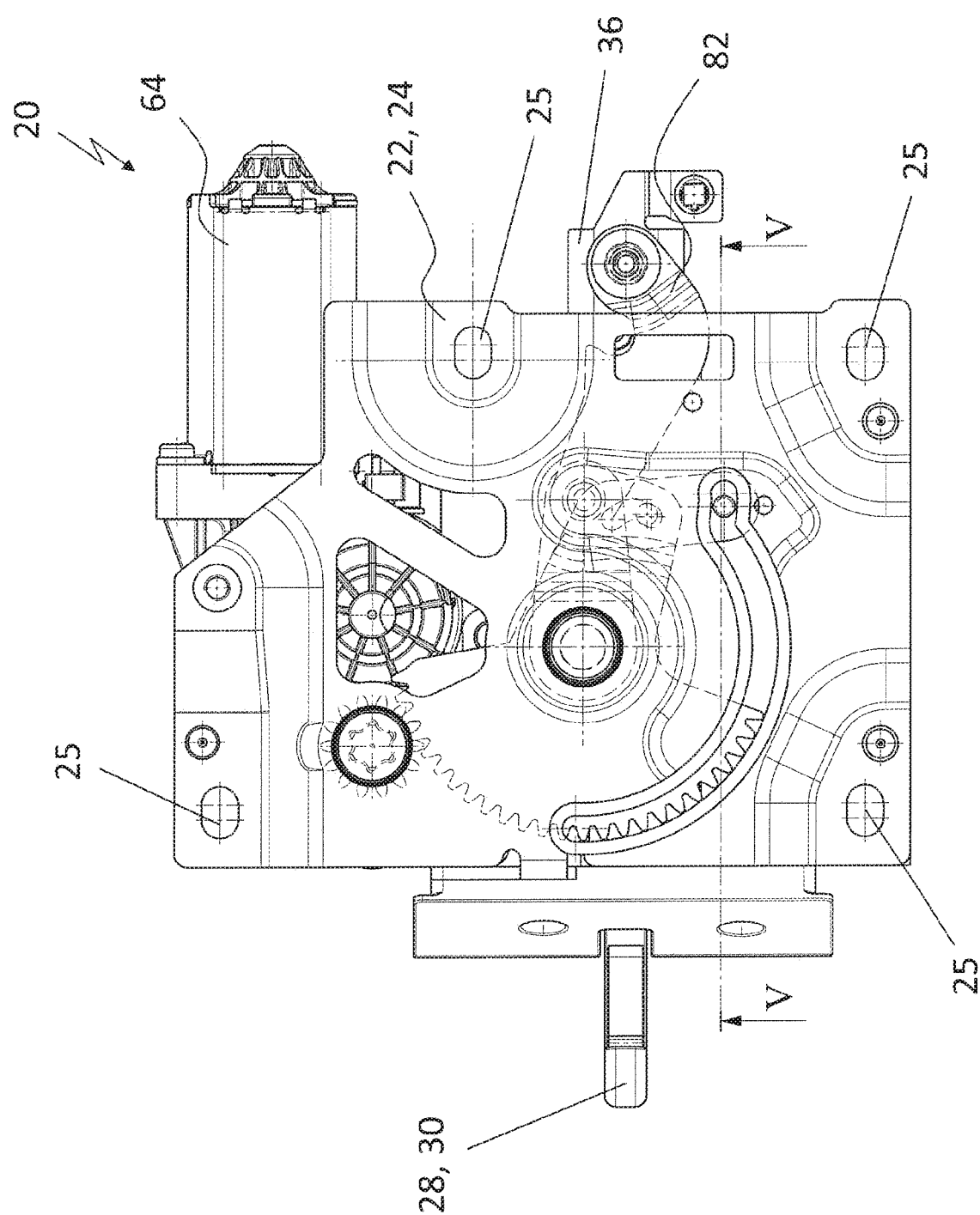
FIG. 4 shows a top view of the locking device in its engaged and latched position.
Figure 5:
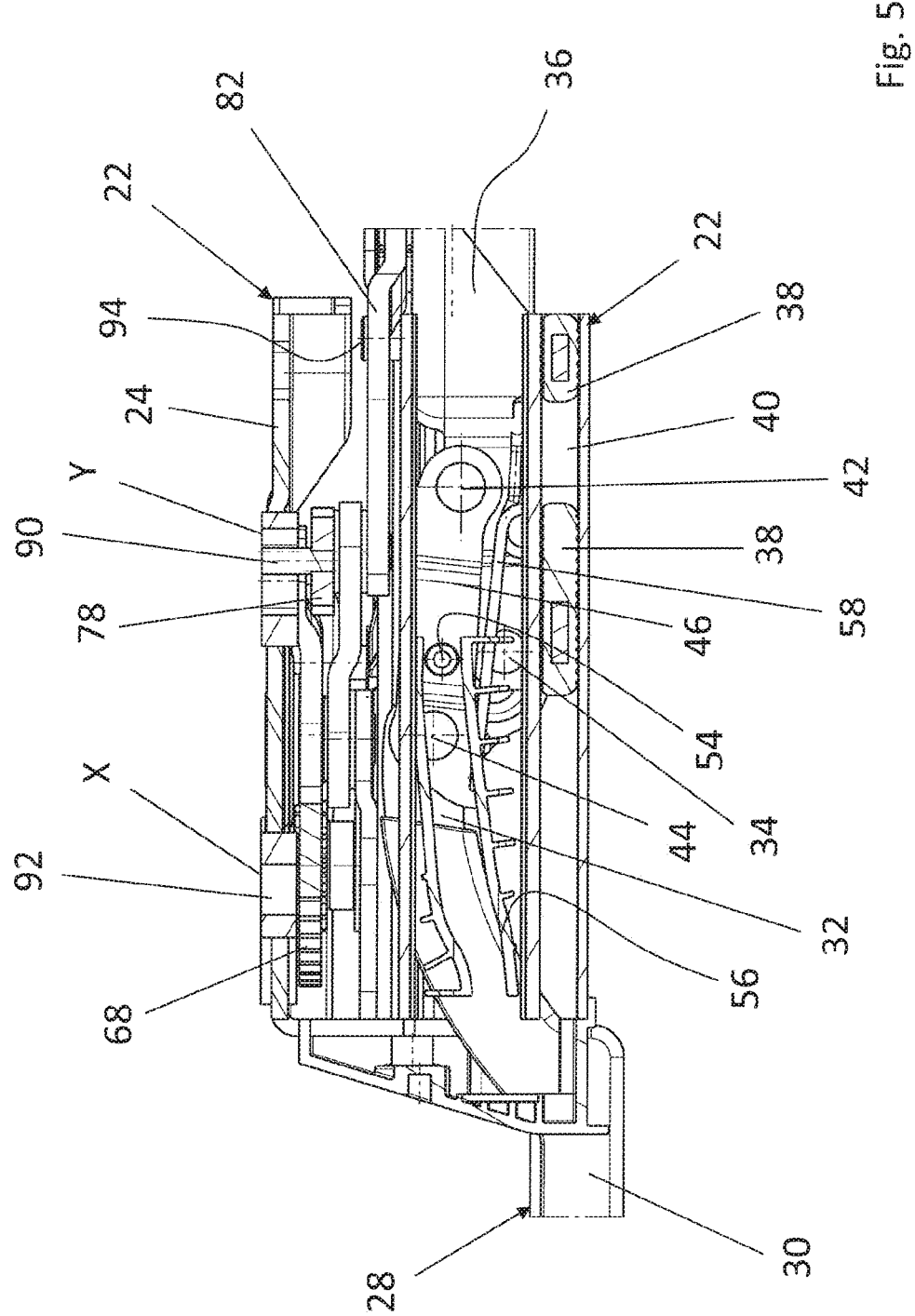
FIG. 5 shows a section through the locking device along line V-V in FIG. 4.

FIG. 1 shows a convertible vehicle 10 which has a folding top 12 that can be displaced between a closed position, in which it covers a vehicle interior, and an open position, in which the vehicle interior is uncovered. In the closed position illustrated in FIG. 1, a front bow 14 of the folding top 12 is fixed to a front header 16 of the vehicle 10, said front header being an upper leg of a frame of a windshield 18 extending in the transverse direction of the vehicle.

A locking device 20 by means of which the closed position of the folding top 12 can be secured and which is illustrated on its own in FIGS. 2 to 11 is disposed on the underside of the front bow 14. The locking device 20 can be displaced between an engaged and latched position, in which the folding top folding top 12 is secured to the front header 16, and a disengaged position, in which the folding top 12 can be detached from the front header 16 and moved into a storage position.

The locking device 20 comprises a locking support 22 which has an upper support plate 24 and which constitutes a housing of the locking device 20. The support plate 24 serves to connect the locking device 20 to the front bow 14 and has screw holes 25 for this purpose.

Moreover, the locking device 20 comprises a locking hook 28 which can be made to engage a locking bolt 26 so as to fix the front bow 14 to the front header 16, said locking bolt 26 constituting a locking counterpart and being disposed on the front header 16 of the vehicle. The locking hook 28 has a hook portion 30, which engages behind the locking bolt 26 in the engaged position, and a mounting and driving portion 32, via which the locking hook 28 is driven.

The locking hook 28 is connected to a slide 36 via a mounting bolt 34 guided in an oblong hole (not shown) of the mounting and driving portion 32, said slide 36 having two gliders 38 on either side of a vertical longitudinal center plane of the locking hook, said gliders 38 being guided in respective guide tracks 40 of the locking support 22.

A pulling link mechanism for driving the locking hook 28 is disposed between the slide 36 and the locking hook 28, said pulling link mechanism being connected to the slide 36 via a mounting journal 42 and being connected to the mounting portion 32 of the locking hook 28 via a mounting journal 44. On its exterior, the pulling link mechanism 46 has a guiding journal 54 which is guided in a guiding track or slotted track 56 which is formed at the interior of the locking support 22 or formed by a separate component which is accommodated by the locking support 22. The separate component can be exchangeable, allowing the guide track formed by it to be adjusted to different top systems in a modular manner.

For preloading the locking hook 28 in the direction of its engaged position, the locking device 20 has a torsion spring 58, one side of which is bears against the slide 36 and the other side of which is in contact with the pulling link mechanism 46 and pushes it upward.

A driving motor 64 is attached to the locking support 22, said driving motor 64 driving a driving pinion 66 which is engaged with a driving wheel 68, which forms a driving element, via external teeth 70 of the driving wheel 68, which can turn about an axis of rotation A. The external teeth 70 extend across an angle of about 140° to 170° at the circumference of the driving wheel 68.

On a cantilever 72 of the driving wheel 68, a V-shaped or arc-shaped slotted track 74 is formed, in which a coupling journal 76 formed on a support link 78 of a link mechanism 80 is guided. The slotted track 74 has a driving portion 741 and a latching portion 742, which extends at an angle relative to the driving portion 741.

In addition to the support link 78, the link mechanism 80 comprises a coupling link 82 which is hinged to the slide 36 in a hinge point 84. Additionally, the link mechanism 80 comprises a guiding link 86 which can pivot about a pivot axis that coincides with the axis of rotation A of the driving wheel 68. The support link 78, the coupling link 82 and the guiding link 86 are connected to each other in a shared hinge 88.

At its end facing away from the hinge 88, the support link 78 comprises a guiding journal 90 which is guided in a guide track 92 formed on the support plate 24 of the locking support 22 and forming an arc-shaped hook displacement portion X which runs concentrically relative to the axis of rotation A of the driving wheel 68 and extends across an angle range of about 110° to 140°. The hook displacement portion X ends in a hook latching portion Y which extends about parallel to the path of travel of the slide 36 and which forms an end portion of the guide track 92.

At its upper side, the slide 36 has a securing pin 94 whose axis is aligned parallel to the axis of rotation of the driving wheel 68. In the engaged position of the locking hook 28 or of the locking device 20, which is illustrated in FIG. 11, for example, the securing pin 94 is supported in a recess 96 formed on the coupling link 82 in case of overload.

The locking device 20 described above is actuated in the manner described below.

Figure 6:
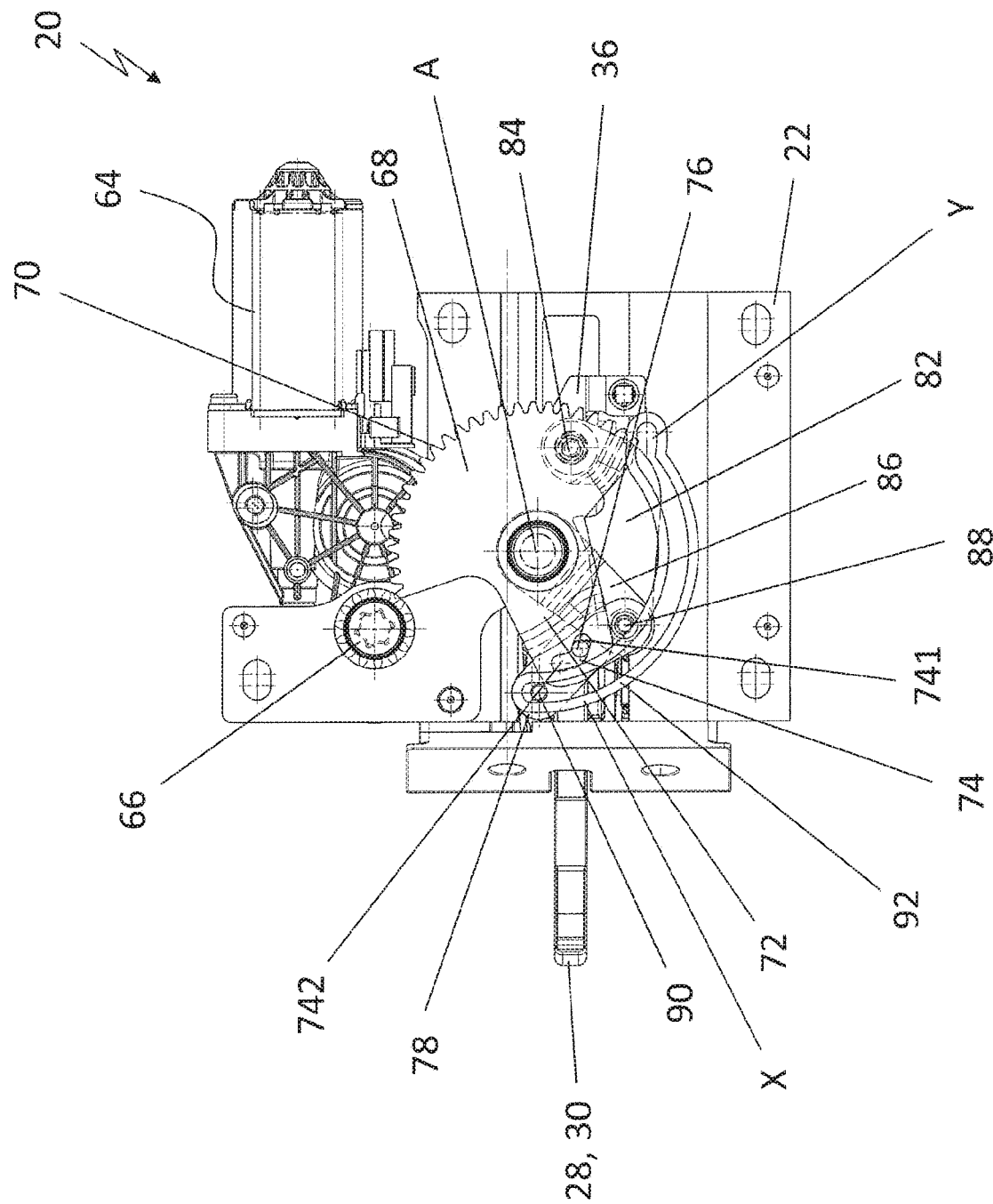
FIG. 6 shows a top view of the locking device in its disengaged position, a support plate not being illustrated.
Figure 7:
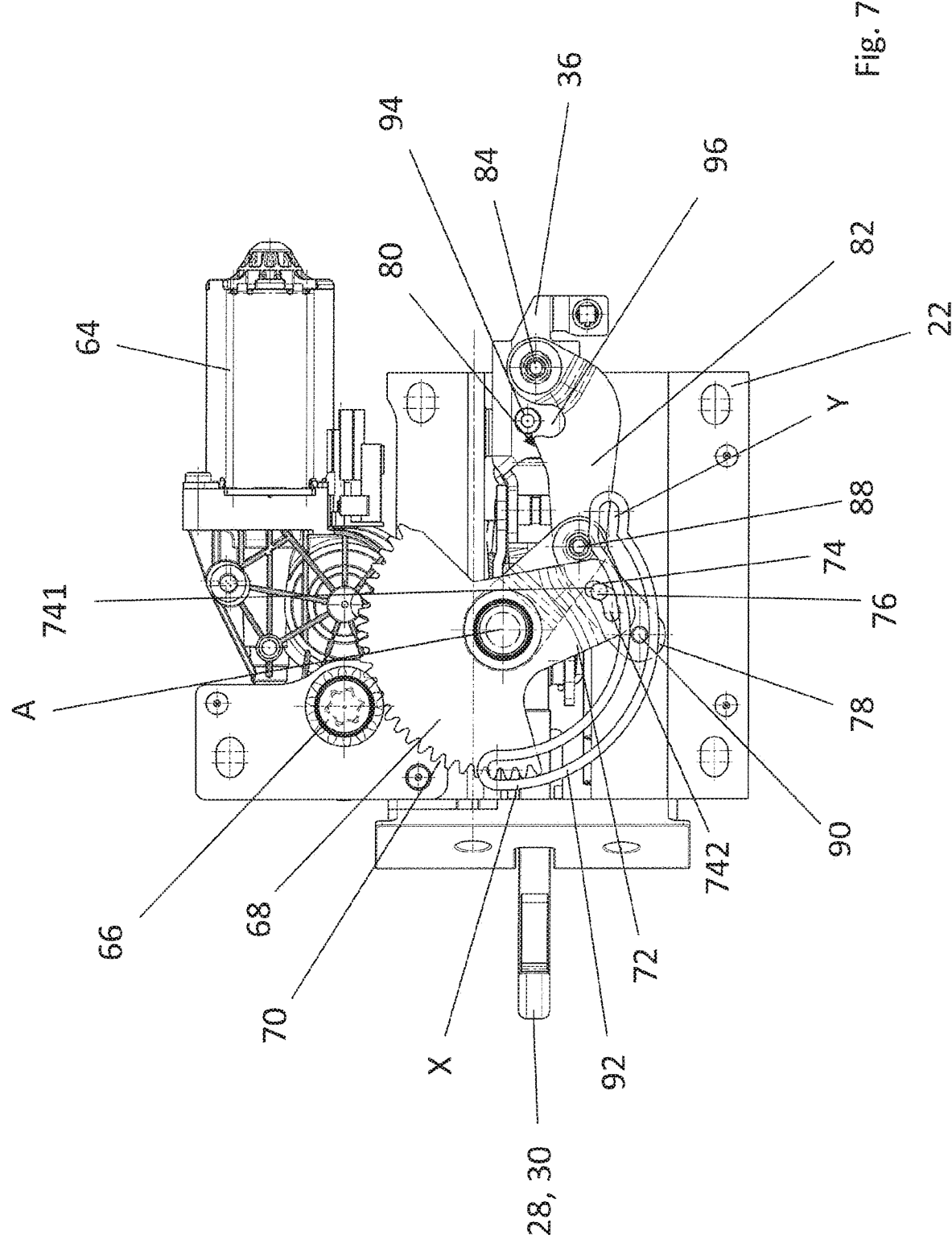
FIG. 7 shows a top view of the locking device as illustrated in FIG. 6, but in an intermediate position during pivoting of a locking hook.
Figure 8:
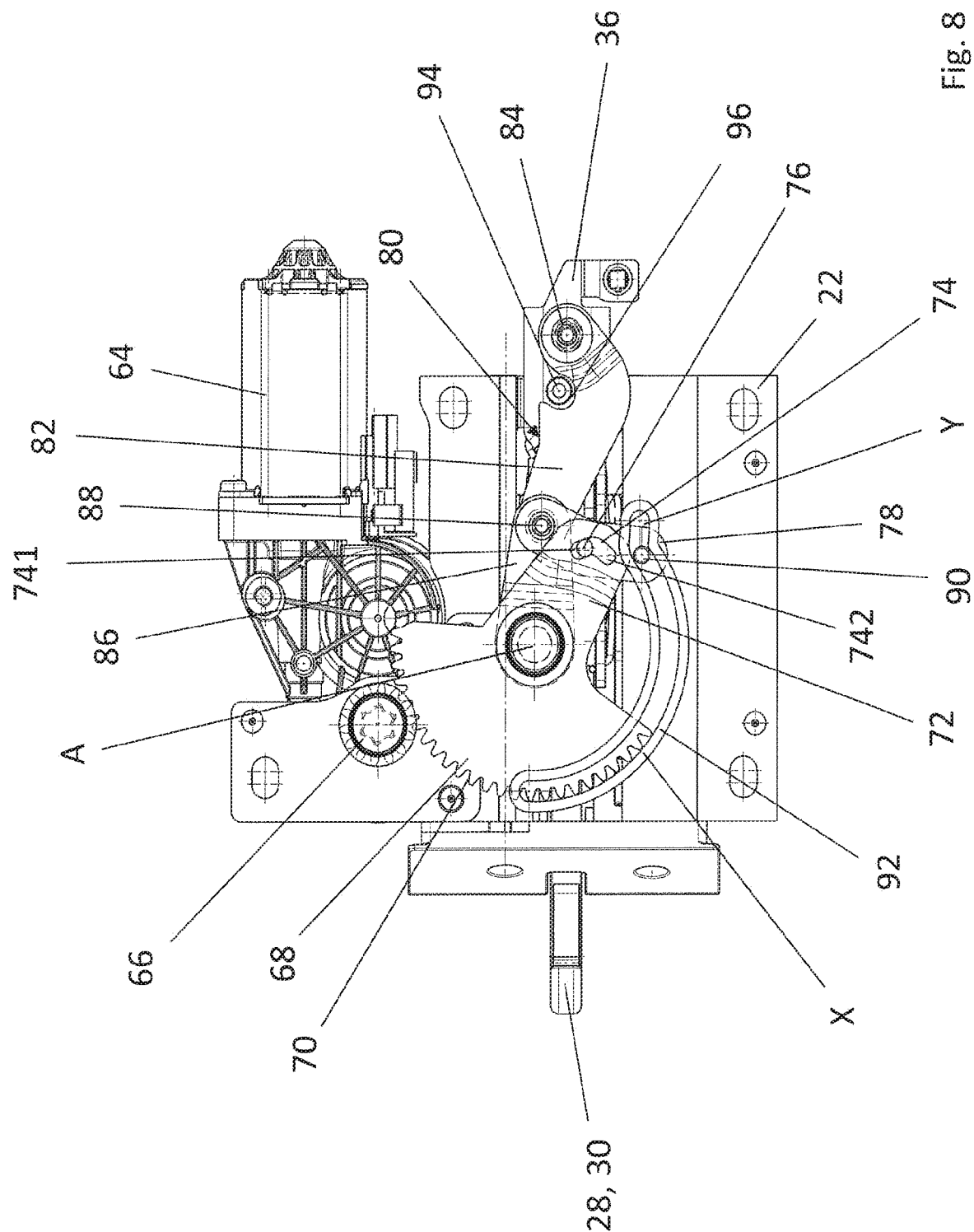
FIG. 8 also shows a top view of the locking device as illustrated in FIG. 6, but in an intermediate position after arrival in a latched or engaged position of the locking hook.
Figure 11:
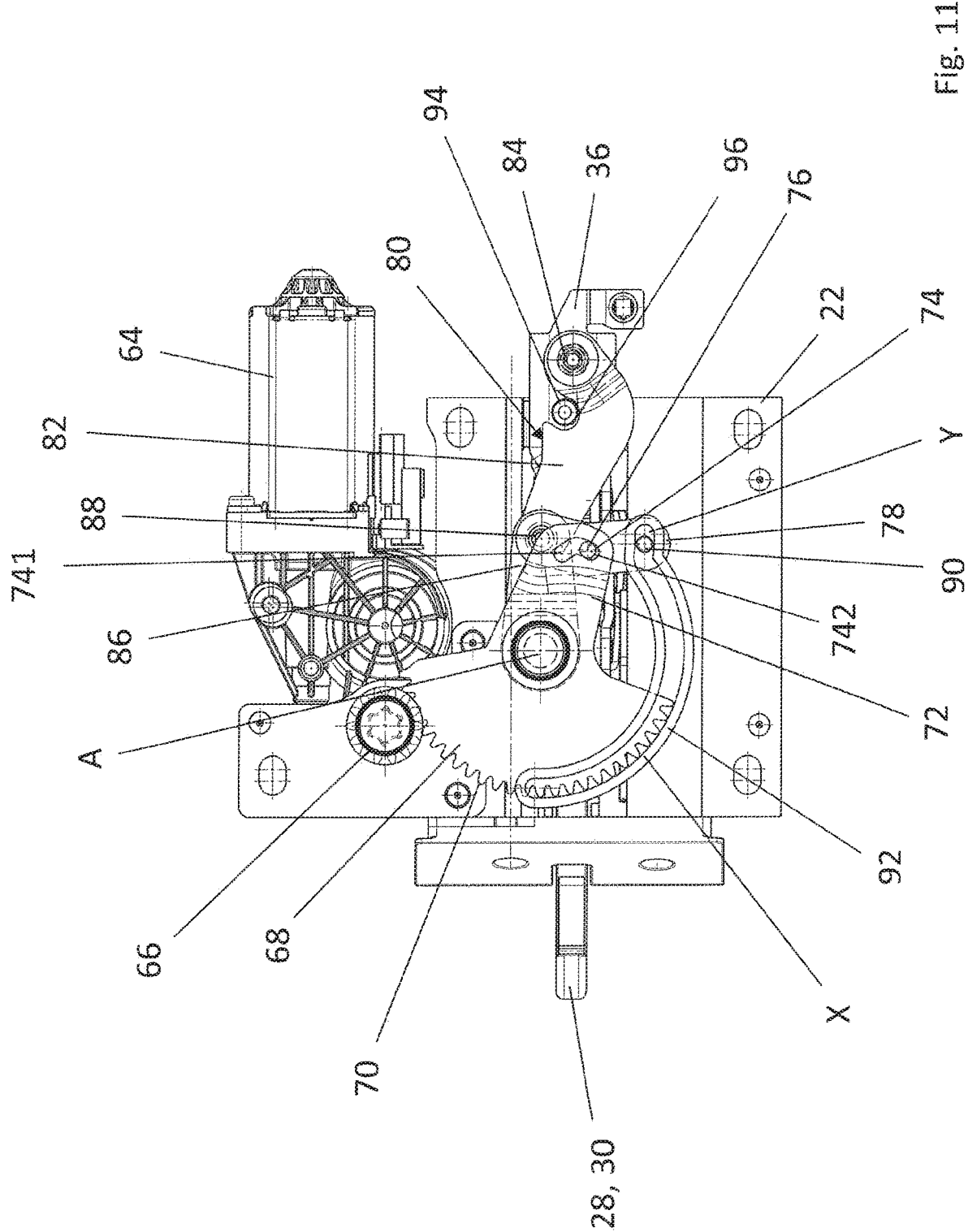
FIG. 11 also shows a top view of the locking device as illustrated in FIG. 6, but in the engaged and latched position of the locking device.

Starting from the disengaged position illustrated in FIG. 6, the locking device 20 can be moved into the engaged position illustrated in FIG. 11, in which latching also takes place. To this end, the driving motor 64 is actuated in such a manner that, in reference to the view selected in FIGS. 6 to 11, the driving wheel 68 is actuated counterclockwise about the axis of rotation A. At this time, the coupling journal 76 of the support link 78 is located in the driving portion 741 of the slotted track 74, and the guiding pin 90 is moved within the hook displacement portion X of the guide track 92. Via the coupling journal 76, a displacement torque is introduced into the link mechanism 80, whereby the slide 36 is moved rearward, i.e. in a direction away from the locking bolt 26. The locking hook 28 is thus pulled and pivoted from its disengaged position illustrated in FIG. 3 into its engaged position illustrated in FIG. 2, in which it is engaged with the locking bolt 26. This position is achieved when the guiding pin 90 has arrived in the area of transition between the hook displacement portion X and the hook latching portion Y in the guide track 92 (cf. FIGS. 8 and 9). The coupling link 82 is then also pivoted far enough for the securing pin 94 to engage into the recess 96.

Figure 9:
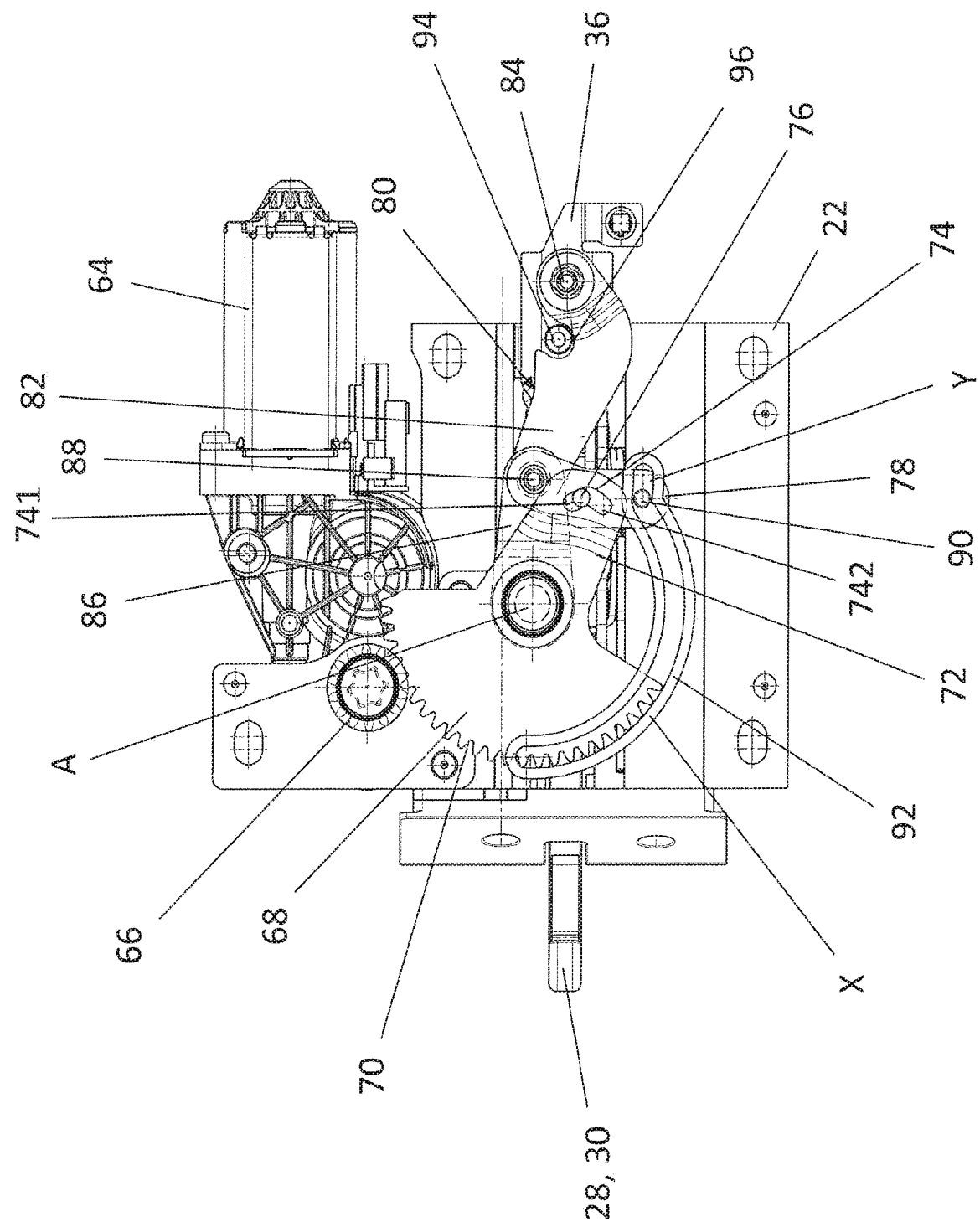
FIG. 9 also shows a top view of the locking device as illustrated in FIG. 6, but in a first transitional position during locking of the locking device.
Figure 10:
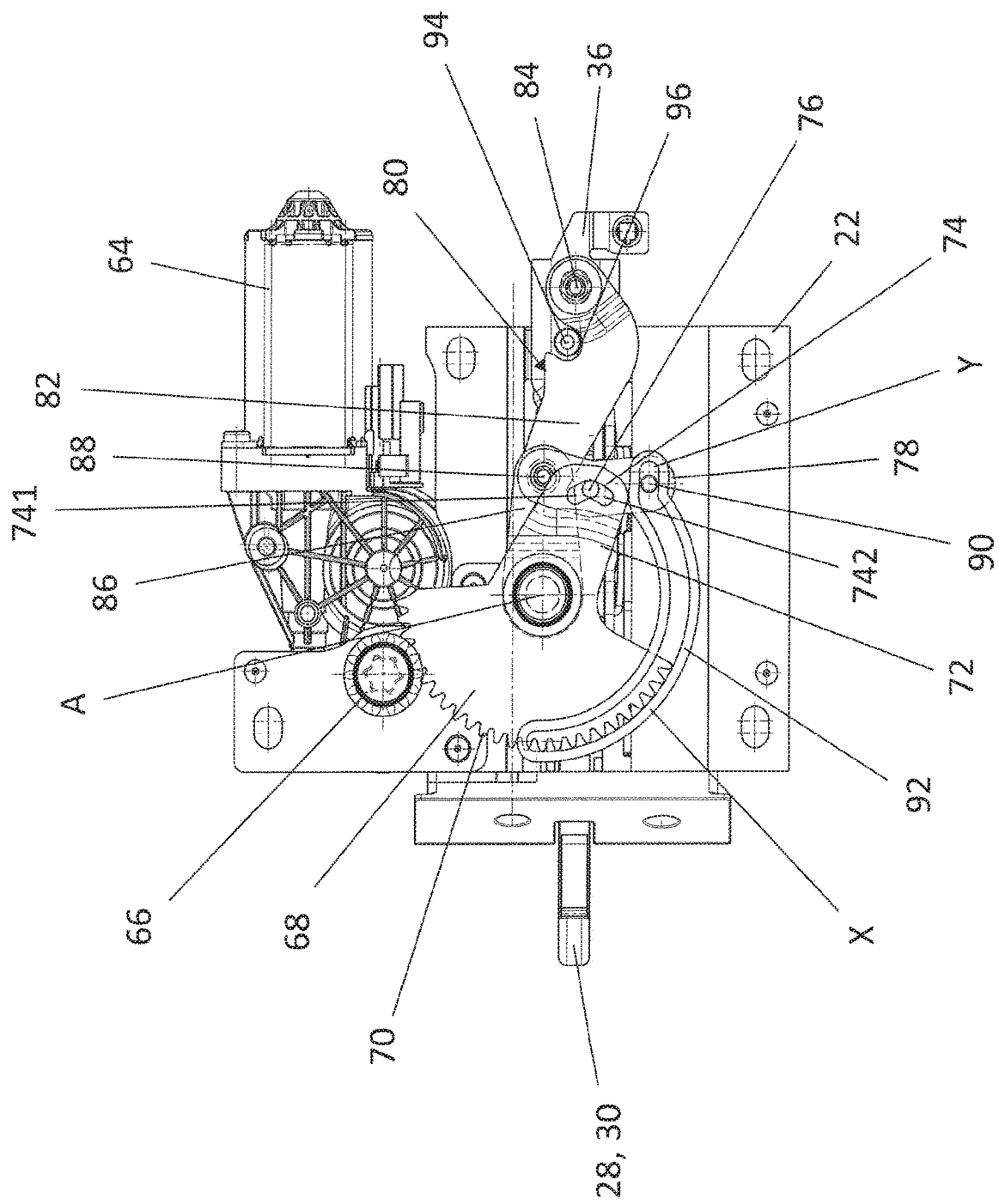
FIG. 10 also shows a top view of the locking device as illustrated in FIG. 6, but in a second transitional position during latching of the locking device.

If, starting from the position illustrated in FIG. 9, the driving wheel 68 is turned further in the counterclockwise direction, the guiding pin 90 enters the hook latching portion Y (cf. FIGS. 9 and 10) as predetermined by the shape of the slotted track 74 in which the coupling journal 76 is shifted from the driving portion 741 into the latching portion 742.

The positioning force of the support link 78 moves the coupling link 82 and the guiding link 86 into an over-center position. A pulling force potentially acting on the locking hook 28 in the opening direction results in a torque that is introduced into the link mechanism 80 and that acts in the direction away from the guide track 92. This torque, however, is held by the guiding pin 90 disposed in the hook latching portion Y of the guide track 92.

The locking device 20 is displaced from the engaged position into the disengaged position analogously in reverse.

REFERENCE SIGNS 10 convertible vehicle
12 folding top
14 front bow
16 front header
18 windshield
20 locking device
22 locking support
24 support plate
25 screw holes
26 locking bolt
28 locking hook
30 hook portion
32 mounting and driving portion
34 mounting bolt
36 slide
38 gliders
40 guide track
42 mounting journal
44 mounting journal
46 pulling link mechanism
54 guiding journal
56 slotted track
58 torsion spring
64 driving motor
66 driving pinion
68 driving wheel
70 external teeth
72 cantilever
74 slotted track
76 coupling journal
78 support link
80 link mechanism
82 coupling link
84 hinge point
86 guiding link
88 hinge
90 guiding pin
92 guide track
94 securing pin
96 recess
741 driving portion
742 latching portion

The invention claimed is:

1. A locking device for a convertible top, comprising a locking support, a locking hook which can be translationally and rotationally shifted so as to be displaced between a disengaged position and an engaged position and which is engaged with a locking counterpart when in the engaged position, and a drive for the locking hook, said drive comprising a driving element which is driven rotationally about an axis of rotation by a driving unit and which drives, via a link mechanism, a slide which can be moved on the locking support and which is connected to the locking hook, the locking hook thus being displaced when the slide is moved, wherein the link mechanism comprises a coupling link which is hinged to the slide and a support link which is hinged to the coupling link and which is guided in a guide track of the locking support when the driving element is actuated, wherein the driving element is realized as a driving wheel.

2. A locking device for a convertible top, comprising a locking support, a locking hook which can be translationally and rotationally shifted so as to be displaced between a disengaged position and an engaged position and which is engaged with a locking counterpart when in the engaged position, and a drive for the locking hook, said drive comprising a driving element which is driven rotationally about an axis of rotation by a driving unit and which drives, via a link mechanism, a slide which can be moved on the locking support and which is connected to the locking hook, the locking hook thus being displaced when the slide is moved, wherein the link mechanism comprises a coupling link which is hinged to the slide and a support link which is hinged to the coupling link and which is guided in a guide track of the locking support when the driving element is actuated, wherein the support link is connected to the driving element.

3. A locking device for a convertible top, comprising a locking support, a locking hook which can be translationally and rotationally shifted so as to be displaced between a disengaged position and an engaged position and which is engaged with a locking counterpart when in the engaged position, and a drive for the locking hook, said drive comprising a driving element which is driven rotationally about an axis of rotation by a driving unit and which drives, via a link mechanism, a slide which can be moved on the locking support and which is connected to the locking hook, the locking hook thus being displaced when the slide is moved, wherein the link mechanism comprises a coupling link which is hinged to the slide and a support link which is hinged to the coupling link and which is guided in a guide track of the locking support when the driving element is actuated, wherein the support link has a coupling journal which engages into a slotted track of the driving element.

4. The locking device according to claim 3, wherein the slotted track of the driving element has a driving portion and a latching portion, which extends at an angle relative to the driving portion.

5. The locking device according to claim 1, wherein the link mechanism comprises a guiding link which is hinged to the support link and/or to the coupling link.

6. The locking device according to claim 1, wherein the guide track of the locking support comprises a hook displacement portion (X) and a hook latching portion (Y) and the hook displacement portion (X) extends concentrically relative to the axis of rotation (A) of the driving element and the hook latching portion (Y) is an end portion of the guide track,.

7. The locking device according to claim 1, wherein a securing pin is disposed on the slide, said securing pin engaging into a corresponding recess of the coupling link when the locking hook is in the engaged position, the securing pin thus securing the locking hook against being displaced in the direction of the disengaged position when the locking hook is in the engaged position.

8. The locking device according to claim 1, wherein the slide is connected to a driving portion of the locking hook via a pulling link mechanism.

9. A top of a convertible vehicle, comprising a locking device according to claim 1 for fixing a top element to a front header of the vehicle.

10. The locking device according to claim 5, wherein the link mechanism has a pivot axis which coincides with the axis of rotation of the driving element.

11. The locking device according to claim 1, wherein the driving wheel has external teeth.

12. The locking device according to claim 2, wherein the link mechanism comprises a guiding link which is hinged to the support link and/or to the coupling link.

13. The locking device according to claim 2, wherein the guide track of the locking support comprises a hook displacement portion (X) and a hook latching portion (Y) and the hook displacement portion (X) extends concentrically relative to the axis of rotation (A) of the driving element and the hook latching portion (Y) is an end portion of the guide track.

14. The locking device according to claim 2, wherein a securing pin is disposed on the slide, said securing pin engaging into a corresponding recess of the coupling link when the locking hook is in the engaged position, the securing pin thus securing the locking hook against being displaced in the direction of the disengaged position when the locking hook is in the engaged position.

15. The locking device according to claim 2, wherein the slide is connected to a driving portion of the locking hook via a pulling link mechanism.

16. The locking device according to claim 3, wherein the link mechanism comprises a guiding link which is hinged to the support link and/or to the coupling link.

17. The locking device according to claim 3, wherein the guide track of the locking support comprises a hook displacement portion (X) and a hook latching portion (Y) and the hook displacement portion (X) extends concentrically relative to the axis of rotation (A) of the driving element and the hook latching portion (Y) is an end portion of the guide track,.

18. The locking device according to claim 3, wherein a securing pin is disposed on the slide, said securing pin engaging into a corresponding recess of the coupling link when the locking hook is in the engaged position, the securing pin thus securing the locking hook against being displaced in the direction of the disengaged position when the locking hook is in the engaged position.

19. The locking device according to claim 3, wherein the slide is connected to a driving portion of the locking hook via a pulling link mechanism.

* * * * *